Feb. 6, 1951 J. V. LUTZ ET AL Re. 23,336

DOOR LOCKING DEVICE

Original Filed April 17, 1947 3 Sheets-Sheet 1

INVENTORS
Jean V. Lutz
Earl H. Keyser
BY
Rebecca W. Prosser
ATTORNEY

DOOR LOCKING DEVICE

Original Filed April 17, 1947 3 Sheets-Sheet 2

INVENTORS
Jean V. Lutz
Earl H. Keyser
BY
ATTORNEY

INVENTORS
Jean V. Lutz
Earl H. Keyser
BY Malcolm M. Fraser
ATTORNEY

Reissued Feb. 6, 1951

Re. 23,336

UNITED STATES PATENT OFFICE 23,336

DOOR LOCKING DEVICE

Jean V. Lutz, Brooklyn, and Earl H. Keyser, East Aurora, N. Y., assignors to Hid-Lok Corporation, New York, N. Y., a corporation of New York Original No. 2,488,213, dated November 15, 1949, Serial No. 741,998, April 17, 1947. Application for reissue September 27, 1950, Serial No. 186,983

6 Claims. (Cl. 292—259)

Matter enclosed in heavy brackets [ ] appears in the original patent but forms no part of this reissue specification; matter printed in italics indicates the additions made by reissue

This invention relates to locking devices for doors, panels, surfaces or bodies requiring latching or locking devices, but more particularly to an automobile body provided with a door latching mechanism, and an object is to produce new and improved means enabling actuation of the door latching mechanism from the outside of the door through an aperture, such as in the door, the arrangement being such that unwarranted access to the operating handle or part may be restrained or prevented by control means arranged on the inside as well as the outside of the door.

Other objects reside in details of construction, arrangement and operation, and for purposes of illustration but not of limitation, an embodiment of the invention is shown in the accompanying drawings, in which Figure 1 is a fragmentary side elevation of an automobile door viewed from the outside showing the flap device for affording access to the door latch handle and showing the lock mechanism in broken lines;

Figure 2:
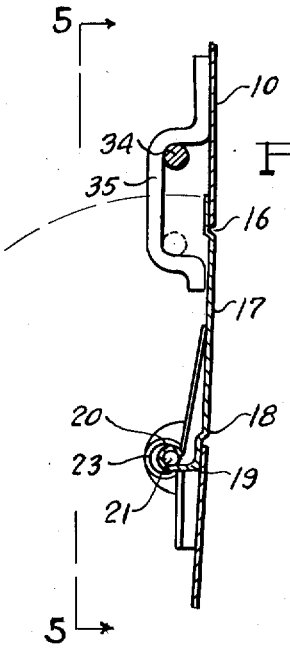
Figure 2 is an enlarged sectional view on the line 2—2 of Figure 1.
Figure 4:
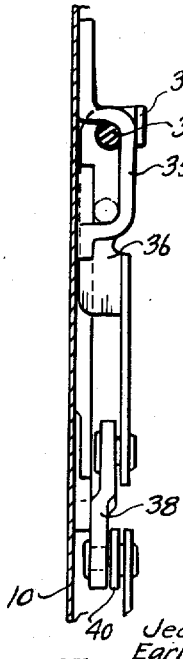
Figure 4 is a sectional view on the line 4—4 of Figure 3.
Figure 5:
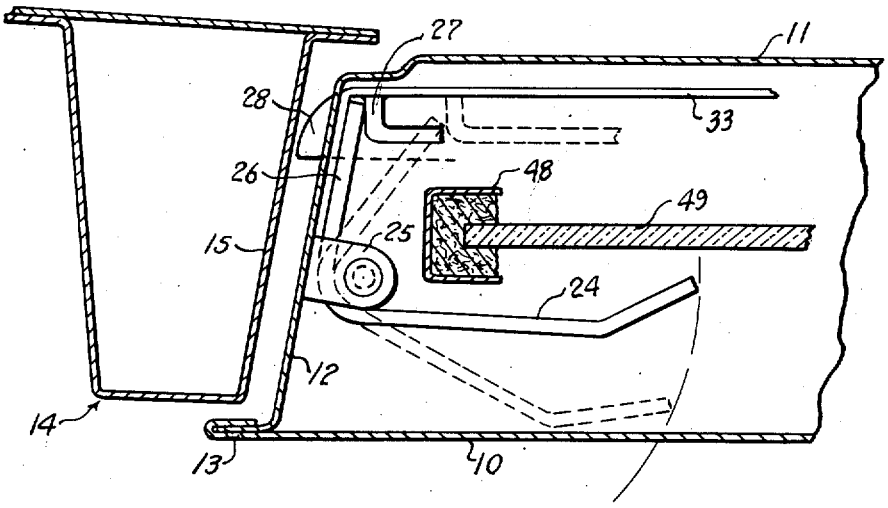
Figure 5 is a view on the line 5—5 of Figure 1.

The illustrated embodiment of the invention comprises an automobile door having spaced outer and inner sheet metal panels 10 and 11 and an edge or connecting panel 12. The front panel 10 has the usual overlap 13 to engage the door pillar 14 which is provided with the usual sloping side walls 15. In accordance with this invention, the front or outside door panel 10 is formed with an opening 16 which, in this instance, is sector-shaped with the straight portion uppermost. Disposed on the inside of the outside door panel 10 is a substantially rectangularly shaped panel or flap 17 which is arranged directly in rear of the opening 16 but is substantially larger than the opening. The flap 17 is formed with an embossed portion 18 shaped to fit the opening 16 and as particularly shown in Figure 2, the outer surface of the embossed portion is preferably flush with the outer surface of the door panel 10.

Formed on the lower portion of the flap 17 are extensions 19 which are looped as indicated at 20 to a fitting pin 21 mounted in brackets 22. Encircling the pin 21 intermediate a pair of brackets 22 is a helical coil spring 23, one end 23a of which bears against the inside of the flap 17, and the other end 23b of which abuts against the inside of the door panel 10. Manifestly, the spring 23 holds the flap 17 in its closed position against the inside of the door panel 10 and closing the opening 16. Thus it will be apparent that the flap 17 is hinged at its lower end for inward swinging movement, and the opening 16 is of such size that a person can push his hand through in order to grasp the door latch actuating handle as will be hereinafter described. If desired, the flap can be pivoted at its upper end instead of its lower end and the shape of the opening 16 may be varied as desired.

Arranged between the door panels 10 and 11 is a suitable latch mechanism and in this instance such mechanism includes a handle 24 which is disposed slightly above the opening 16 in a position convenient to be grasped by a person's hand extended into the opening and after the flap 17 has been swung inwardly. Thus in order to gain access to the latch operating handle, the hand is inserted into the opening 16 and the flap 17 is rocked inwardly a sufficient amount for the purpose, and in this instance, the palm of the hand would be uppermost. Manifestly, if the flap is hinged at its upper edge, the palm of the hand would face downwardly and the latch operating handle will be arranged slightly below the access opening.

The latch handle 24 is pivotally mounted between brackets 25 and is formed with an integral leg 26 extending at substantially right angles for engagement with a shoulder 27 engaging a shoulder on the bolt nose 28. The bolt nose 28 is riveted to a bolt plate 29 and a spiral spring 30 urges the bolt nose to latching position. The bolt plate 29 has an elongate slot 31 to receive a header rivet 32 on the main plate 33 for guiding the movement of the bolt plate to and from latching position. The main plate 33 of the latch mechanism is suitably mounted in rigid position adjacent the inner door panel 11, preferably on a supporting panel (not shown).

The latch bolt may be retracted from the inside of the door by means of a link 51 which has a pin and slot connection with the bolt plate 29 at one end and is connected at its opposite end to a remote control mechanism (not shown).

Mechanism is provided for blocking the inward swinging movement of the flap 17 in order to militate against unwarranted access to the latch operating lever or handle 24 and for this purpose, a rod 34 is normally disposed on the inside of the outer door panel 10 above the upper edge of the flap 17. The rod 34 is somewhat longer than the flap 17 and the ends of the rod extend into arched guide plates 35 which are suitably secured as by welding to the inside of the door panel 10. The guide plates 35 form a part of a generally U-shaped mounting plate on which is mounted not only the flap plate 17 but its associated actuating mechanism as hereinafter described.

Figure 1:
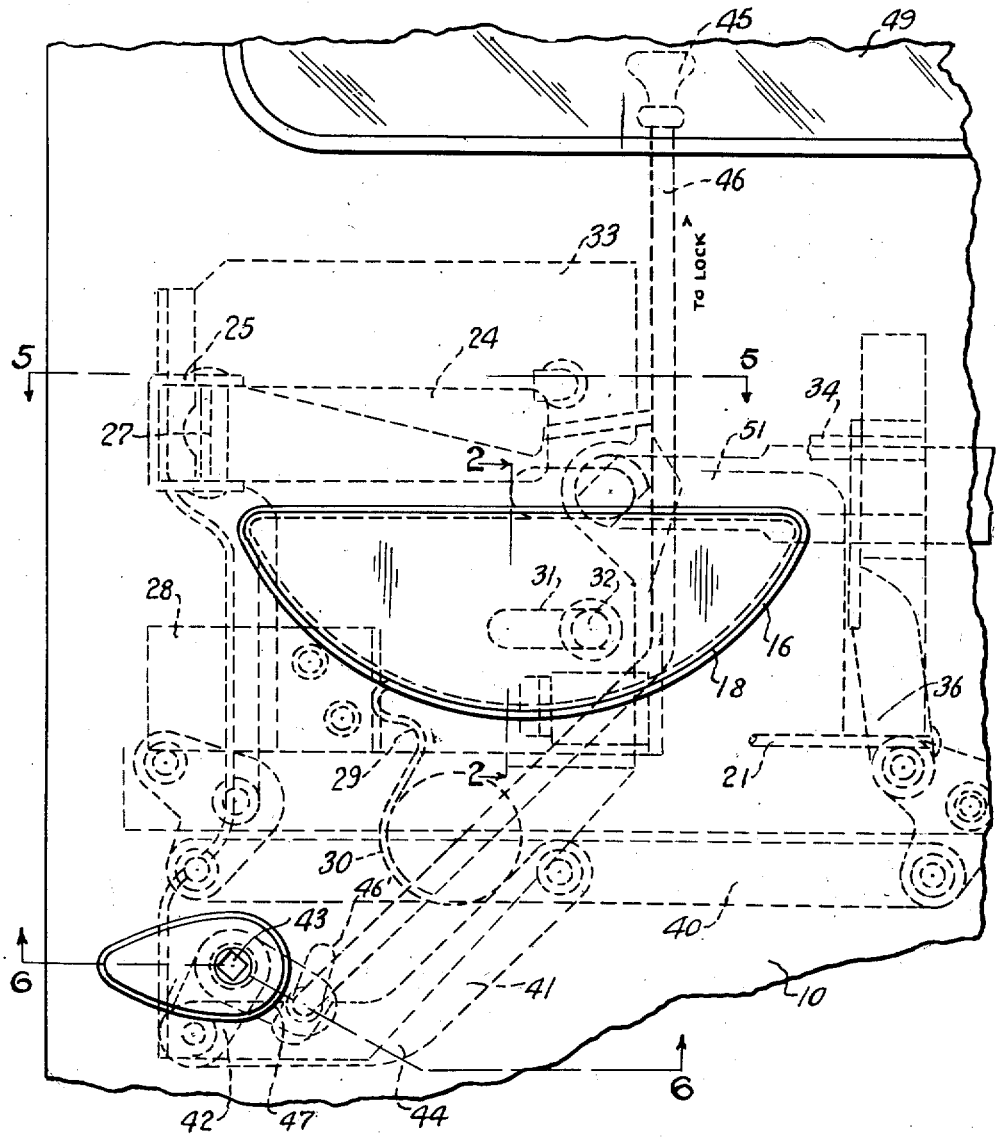
Figure 3:
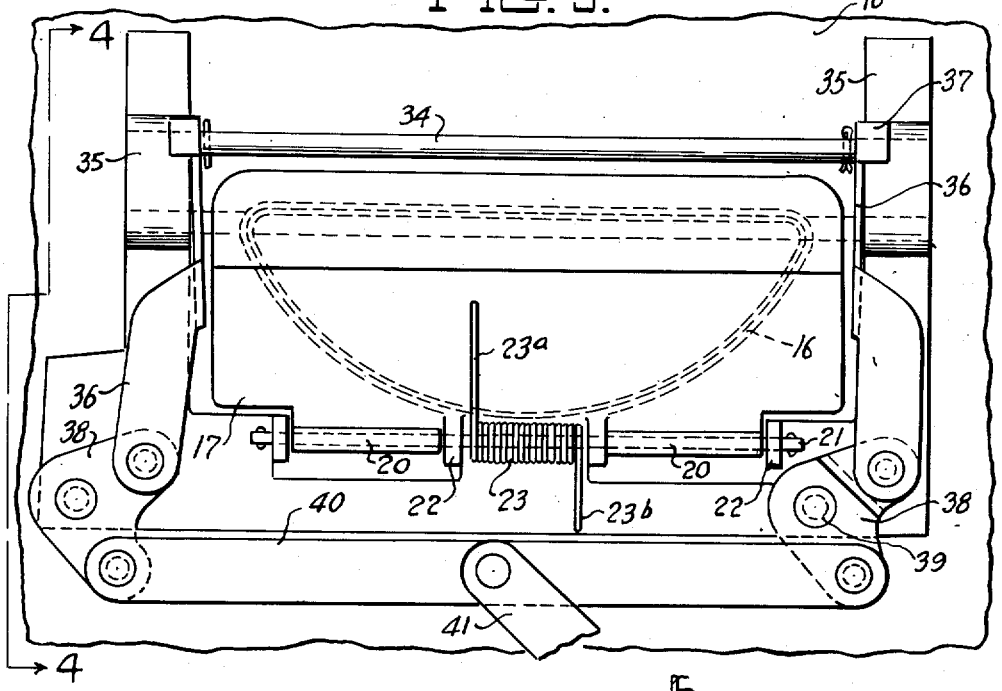
Figure 3 is an elevation of the pivoted flap and associated blocking mechanism for holding the flap against swinging movement.

The guides enable vertical movement of the rod 34 to and from blocking position with respect to the flap 17. Opposite end portions of the rod 34 fit into apertures in an arm 36, one being disposed on the inner side of each of the guides 35 and each arm 36 having a flange 37 which engages the outer surface of the guide 35 for sliding movement along the same. The arm 36 extends downwardly and is provided with a right angle flange portion at the lower end pivotally to engage an arm of a bell crank 38 which is pivoted at 39. Pivotally connecting the other arm of the two bell cranks is a link 40. Upon shifting movement of the link 40 to the right of Figure 3, the rod 34 will be moved upwardly to its normal position away from the flap 17 and upon shifting movement of the link 40 to the left of Figure 3, the rod 34 will be moved downwardly directly in rear of the upper portion of the flap 17, thereby blocking inwardly swinging movement of the flap to prevent access to the latch operating handle or lever 24.

For imparting rectilinear shifting movement to the link 40, an arm 41 is pivoted to an intermediate portion of the link 40 at one end and the opposite end is pivoted to an arm 42 which is rotatable with a polygonally shaped shaft 43. It will be observed that the arm 41 has a bend at 44 and that upon turning the shaft 43 in one direction or the other, shifting movement will be imparted to the link 40 in one direction or the other.

Figure 6:
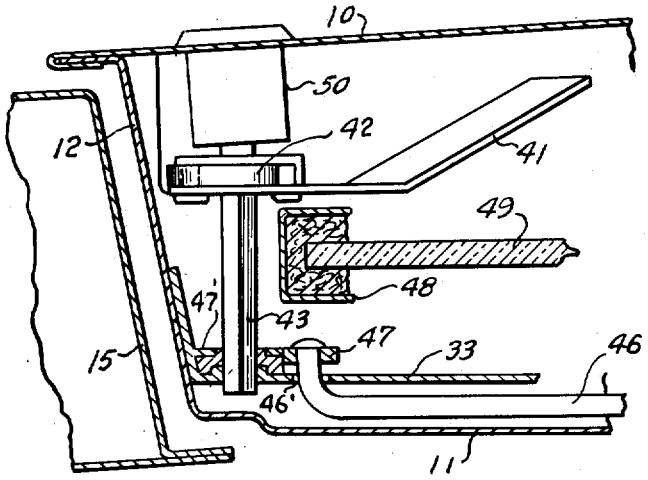
Figure 6 is a sectional view on the line 6—6 of Figure 1.

The polygonal or squared shaft 43 may be rocked from the inside of the door by a push button 45 which is mounted on a vertically disposed rod 46, the lower end of which is bent to engage an arm 47 secured to the squared shaft 43 for rotation therewith, the extreme end portion of the rod 46 extending through a slot 46′ in the main plate 33 of the latch mechanism. As particularly shown in Figure 6, the outer end portion of the arm 47 is embossed outwardly and the hub portion engages the shaft 43, the hub portion having an annular recess rotatably to engage a box on the main plate 33. A cover plate 47′ fixed to the case plate retains the arm 47 in position. The button 45 is accessible in the usual manner adjacent the window reveal and by pulling upwardly on the button 45 through the connection described, the blocking rod 34 will be moved into blocking position, and by pushing downwardly on the button, the rod 34 will be moved upwardly away from the flap 17.

The squared shaft 43 is disposed between the door edge panel 12 and the glass run 48 in which the window panel 49 is slidable. Mounted in the outside door panel 10, so as to be accessible from the outside, is a key-operated cylinder lock mechanism 50 and this mechanism is operatively connected to impart rotational movement to the shaft 43. The lock unit 50 is a well-known tumbler lock of the type that is actuated by turning the key a predetermined distance so as to effect the downward movement of the blocking rod 34 through the connections described, whereupon the key may be turned back to its original position and withdrawn. Lock units of this type are well-known in the art and since the structure per se forms no part of the present invention, detail illustration and description are not considered necessary.

From the above description, it is manifest that we have produced an exceedingly simple and inexpensive expedient for locking the door of vehicles such as an automobile. An outstanding advantage resides in the fact that there are no projecting elements on the outside of the door so that true streamlining can be achieved. Inasmuch as the latch operating handle 24 is concealed from view, the need for expensive plating and styling is obviated. A still further advantage resides in the fact that unwarranted access to the inside of the vehicle is rendered extremely difficult, if not impossible, to obtain.

Although the above description has been directed to an embodiment of the invention in an automobile door, it is to be understood that the device can be used advantageously in connection with any door panel such as for residences, cupboards, and is equally useful in connection with a door which is mounted for sliding as well as swinging movement.

Numerous changes in details of construction, arrangement and operation may be effected without departing from the spirit of the invention especially as defined in the appended claims.

What we claim is:

1. In an automotive vehicle provided with a door having spaced inner and outer panels and a latch mechanism disposed between the panels, a pivotal handle for actuating the latch mechanism disposed between the panels and directly in rear of the outer panel, the outer panel being apertured in the region of said latch handle, a pivotally mounted spring tensioned flap on the inside of the outer door panel covering said aperture so that upon inward swinging movement thereof, access to the latch handle is afforded, a blocking rod on the inside of the outer door panel movable to and from blocking position with respect to said flap, and independently operable manual means operable respectively from the inside and outside of the door for actuating said blocking rod.

2. In an automotive vehicle provided with a door having spaced inner and outer panels and a latch mechanism disposed between the panels, an operating part for the latch mechanism arranged adjacent to and on the inner side of the outer door panel, the outer panel having a sector-shaped aperture in the region of said operating part, a substantially rectangular flap on the inside of the outer panel covering said aperture and having an embossed portion fitting the same so that the outer surface of the outer door panel is substantially flush, said flap having its edge portions overlapping the inner side of said outer door panel adjacent said aperture, a pivotal mounting pivotally supporting one side of said flap on the inner side of said outer door panel whereby the free side may be swung inwardly from closed to open position, spring means normally holding said flap in closed position, a rod movable between two positions, in the first of which positions said rod is engaged behind the free side of said flap whereby to block the same against inward movement and in the other of which positions said rod is disposed away from said flap in unblocking relationship thereto, means movably supporting each end of said rod for movement between said positions, and means for moving said rod between said positions.

3. In an automotive vehicle provided with a door having spaced inner and outer panels and a latch mechanism disposed between the panels, a latch actuating member disposed between the panels directly in rear of the outer panel, the outer panel being apertured in the region of said latch actuating member, a pivotally mounted spring tensioned flap on the inside of the outer door panel covering said aperture so that upon inward swinging movement thereof, access to the latch actuating member is afforded, flap blocking mechanism on the inside of the outer door panel movable to and from blocking position with respect to said flap, an actuator for said flap blocking mechanism, said actuator being movable in opposite directions, linkage operably connecting said actuator and said flap blocking mechanism whereby, upon selective movement of said actuator in one direction or the other said flap blocking mechanism is respectively moved to and from blocking position with respect to the flap, and independently operable means operable respectively from the inside and outside of the door for moving said actuator.

4. In an automotive vehicle provided with a door having spaced inner and outer panels and a latch mechanism disposed between the panels, a latch actuating member disposed between the panels and directly in rear of the outer panel, the outer panel being apertured in the region of said latch actuating member, a pivotally mounted spring tensioned flap on the inside of the outer door panel covering said aperture so that upon inward swinging movement thereof, access to the latch actuating member is afforded, flap blocking mechanism on the inside of the outer door panel movable to and from blocking position with respect to said flap, and mechanism for actuating said flap blocking mechanism and adapted to be operated selectively by a push, pull knob accessible from the inside of the door and a rotatable member accessible from the outside of the door.

5. In an automotive vehicle provided with a door having spaced inner and outer panels and a latch mechanism disposed between the panels, a pivotal handle for actuating the latch mechanism disposed between the panels and directly in rear of the outer panel, the outer panel being apertured in the region of said latch handle, a pivotally mounted spring tensioned flap on the inside of the outer door panel covering said aperture so that upon inward swinging movement thereof, access to the latch handle is afforded, a blocking rod on the inside of the outer door panel, means on opposite sides of said flap slidably supporting the ends of said rod adjacent the inner side of said outer panel for sliding movement to and from blocking position with respect to said flap, and manually operable means on the inside of the door for actuating said blocking rod to and from blocking position.

*6. In a door having a panel, a latch mechanism disposed directly in the rear of the panel, said latch mechanism including a retractible latching element, a manually engageable member movably mounted behind the panel and having means for engaging and retracting the latch element upon manual operation, the panel being apertured in the region of said manually engageable member, a pivotally mounted spring tensioned flap on the inside of the panel covering said aperture, said manually engageable member being movably mounted on the door adjacent the aperture so that upon inward swinging movement of said flap, access to the manually engageable member is afforded, a blocking member on the inside of the panel movable to and from blocking position with respect to the flap, and means for actuating said blocking member.*

JEAN V. LUTZ.
EARL H. KEYSER.

REFERENCES CITED

The following references are of record in the file of this patent or the original patent:

UNITED STATES PATENTS

| Number | Name | Date |
|---|---|---|
| 1,430,330 | Seaver | Sept. 16, 1922 |
| 1,866,299 | Ericson | July 5, 1932 |
| 2,164,150 | Brewster | June 27, 1939 |
| 2,237,949 | Palmer | Apr. 8, 1941 |